(No Model.) 2 Sheets—Sheet 2.

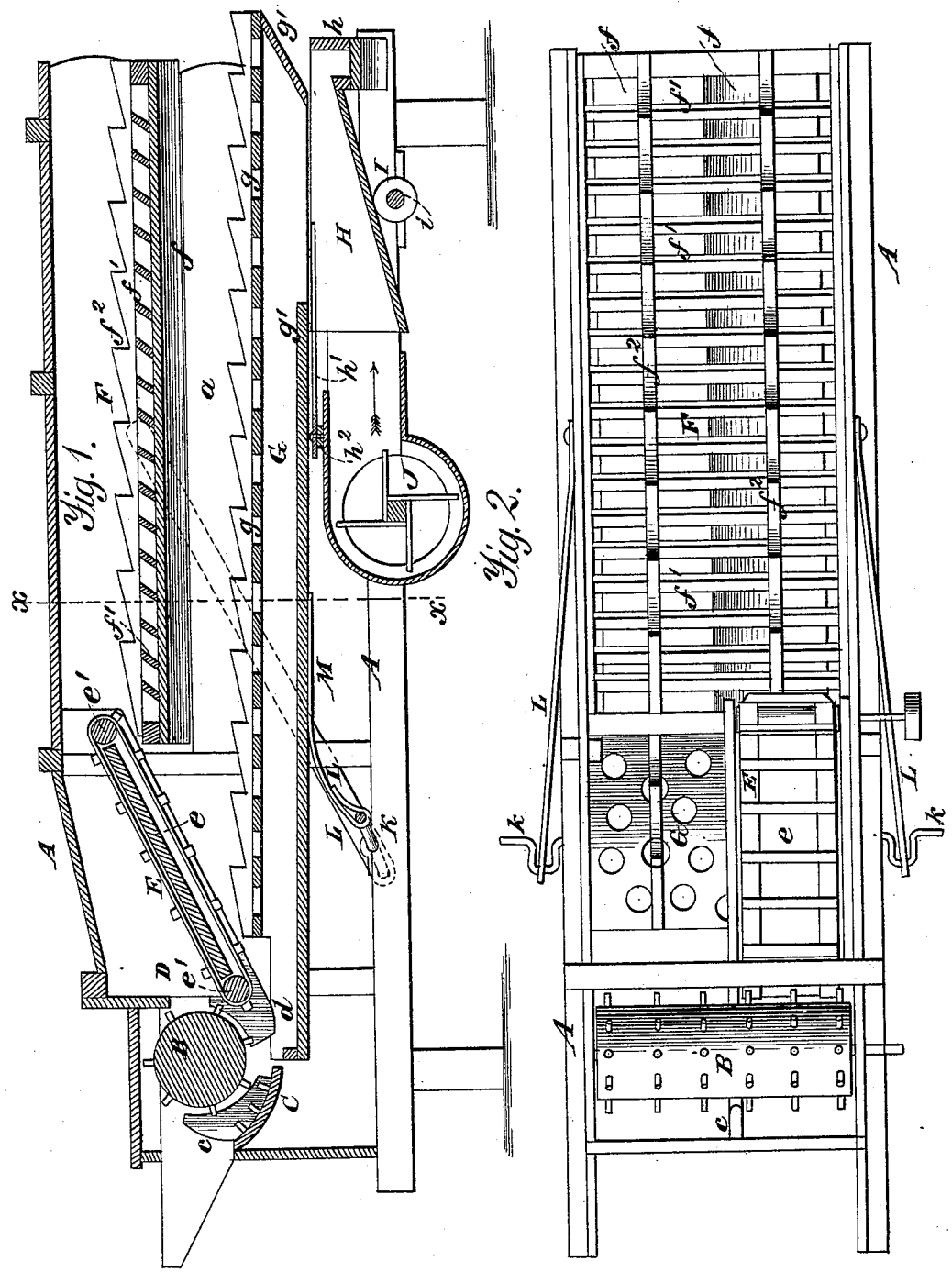

E. REESE.

GRAIN THRASHER AND SEPARATOR.

No. 249,858. Patented Nov. 22, 1881.

Witnesses.
A. Ruppert.
John A. Ellis.

Inventor.
Edward Reese,
by Theodor Neungen
his Attorney

N. PETERS, Photo-Lithographer, Washington, D. C.

UNITED STATES PATENT OFFICE.

EDWARD REESE, OF FINDLAY, OHIO.

GRAIN THRASHER AND SEPARATOR.

SPECIFICATION forming part of Letters Patent No. 249,858, dated November 22, 1881.

Application filed August 26, 1881. (No model.)

*To all whom it may concern:*

Be it known that I, EDWARD REESE, a citizen of the United States of America, residing at Findlay, in the county of Hancock and State of Ohio, have invented certain new and useful Improvements in Thrashing-Machines and Grain-Separators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in thrashing-machines and grain-separators, and has for its object the production of a machine whereby I am enabled to double the capacity of the mechanism for separating the straw, &c., from the grain with reference to the capacity of the thrashing mechanism; and to this end the invention consists in novel features of construction and combination and arrangement of parts, all as will be hereinafter fully described, and specifically pointed out in the claims.

Figure 4:
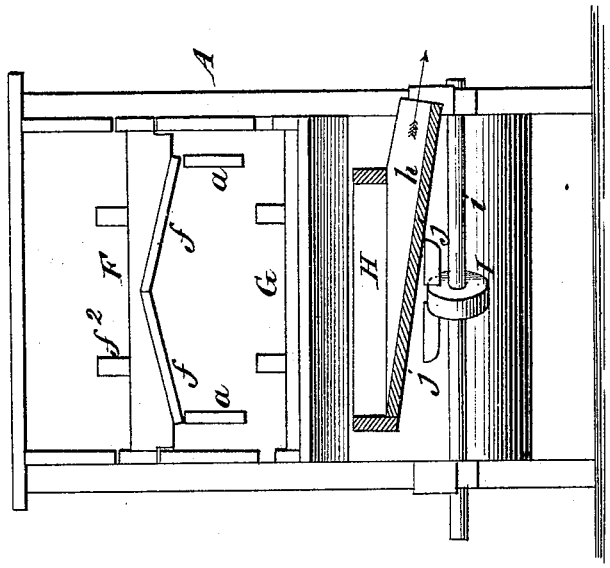
Figure 3:
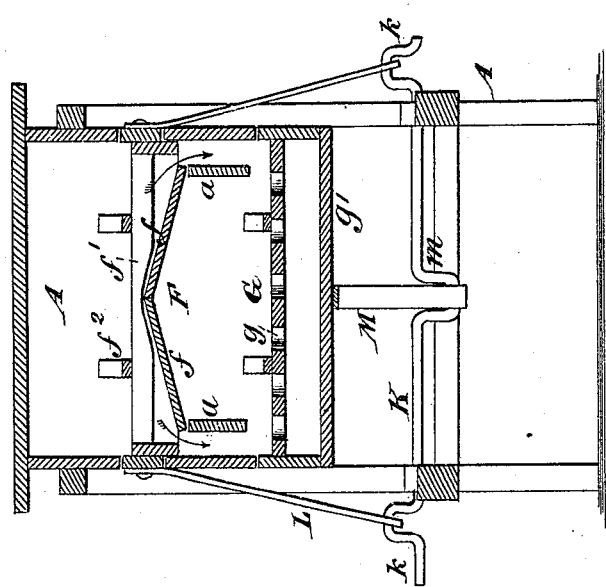

Referring to the accompanying drawings, Figure 1 represents a longitudinal vertical section of my improved machine; Fig. 2, a top view or plan with the top of the casing removed; Fig. 3, a transverse section through the line $x\ x$ of Fig. 1. Fig. 4 is an end view, partially in section.

In the drawings, A represents the frame and casing for supporting the operating mechanism; B, the usual thrashing-cylinder, and C the concave.

$c$ represents a curved division-board, arranged in front of the thrashing-cylinder and extending down between it and the concave, and D an inclined division-board arranged in rear of said cylinder and concave, with its lower and front end, $d$, projecting forward between them and on a line with the division-board $c$. Between said division-board D and one side of the casing of the machine is arranged an inclined board, $e$, over and around which and rollers $e'\ e'$ passes an endless apron or carrier, E, by which the grain, straw, &c., passing between the cylinder and concave on one side of the division-boards $c$ and D is conveyed and delivered into the head of the upper vibrating separator, F, while that passing between the cylinder and concave on the other side of said division-boards is delivered onto the head of the lower vibrating separator, G.

The upper separator, F, is composed of an inverted V-shaped bottom, $f$, a series of upwardly and rearwardly inclined transverse slats, $f'$, and a series of longitudinal notched bars, $f^2$, arranged over said slats, and through the medium of said slats and bars $f'\ f^2$ and the vibrating movement of the separator the straw is separated from the grain and carried over the tail of the separator, while the grain falls between said slats onto the bottom board, $f$, from which it is discharged on opposite sides thereof, and passes down between the longitudinal suspended division-boards $a\ a$ and the sides of the casing of the machine onto the lower perforated separator, G. The separator G is provided with a perforated bottom, $g$, having a series of longitudinal notched bars, through the medium of which and the vibrating movement of the separator the straw is separated and carried over the tail-end thereof, while the grain passes through the perforations thereof, as also the grain from the upper separator, F, onto an inclined bottom, $g'$, from which it is discharged into the usual separating-shoe, H, having the usual separating-screens and a transverse discharge-spout, $h$, at the rear end thereof. This shoe H is suspended at its front end by the pivoted ends of a V-shaped bar, $h'$, which is also pivoted to a cross-bar, $h^2$, and near the rear end said shoe rests on a cam, I, mounted on a transverse shaft, $i$, said cam working between two blocks, $j\ j$, secured to the under side of said shoe, and through the medium of which the shoe is vibrated transversely, in order to keep the chaff loose from the screens, so that it can be acted upon by the blast from fan J, and thereby removed or blown over the tail of the shoe in the usual manner.

K represents a transverse shaft, having end cranks, K K, connected by pivoted rods or bars L L with the sides of the upper separator, F, and a central crank, $m$, arranged reversely to the end cranks, and connected to the bottom of the lower separator, G, by a pivoted bar or rod, M. By the above-described arrangement of cranks and pivoted connecting bars or rods said separators F and G receive simultaneous longitudinal vibrations in opposite directions.

The operating mechanism of the machine can be connected by bands and pulleys and driven from any prime motor common to this class of machines.

Further description of the operation of my improved machine is deemed unnecessary, it being obvious from the foregoing description. By my improved construction, however, it will be observed that the capacity of the mechanism for separating the straw from the grain is double that of the capacity of the thrashing mechanism, thus insuring a more complete separation, while obviating the grain passing over the tail of the separators, as is generally the case in this class of separators where a single separator is used to receive the grain, straw, &c., from the thrashing mechanism.

Having thus fully described my invention, what I claim as new, and desire to secure by Letters Patent, is—

1. In a combined thrasher and separator, the combination, with the thrashing mechanism, of two separators, F G, arranged one above the other, and means, substantially as described, whereby the straw, grain, &c., passing through the thrashing mechanism is divided and a portion delivered to each of said separators, substantially as and for the purpose specified.

2. In a combined thrasher and separator, the combination, with the thrashing mechanism, of the division-boards $c$ D, endless carrier or apron E, and the vibrating separators F G, substantially in the manner as and for the purpose herein shown and described.

3. In a combined thrasher and separator, the combination of the upper separator, F, constructed with the inverted-V-shaped bottom $f$, series of transverse slats $f'$, and longitudinal notched bars $f^2 f^2$, and the lower separator, G, constructed with the perforated bottom $g$ and longitudinal notched bars $g'$, substantially as and for the purpose herein shown and described.

4. In a combined thrasher and separator, the combination of the upper separator, F, an inverted-V-shaped bottom, $f$, the longitudinal division-boards $a\ a$, and the lower separator, G, substantially as and for the purpose herein shown and described.

In testimony whereof I affix my signature in presence of two witnesses.

EDWARD REESE.

Witnesses:
W. MUNGEN,
JAS. A. BOPE.